(12) United States Patent  
Luerkens

(10) Patent No.: US 7,944,719 B2  
(45) Date of Patent: May 17, 2011

(54) VOLTAGE MULTIPLIER WITH IMPROVED POWER EFFICIENCY AND APPARATUS PROVIDED WITH SUCH VOLTAGE MULTIPLIER

(75) Inventor: Peter Luerkens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 639 days.

(21) Appl. No.: 12/063,236

(22) PCT Filed: Aug. 1, 2006

(86) PCT No.: PCT/IB2006/052625  
§ 371 (c)(1),  
(2), (4) Date: Feb. 8, 2008

(87) PCT Pub. No.: WO2007/017793  
PCT Pub. Date: Feb. 15, 2007

(65) Prior Publication Data  
US 2010/0135052 A1   Jun. 3, 2010

(30) Foreign Application Priority Data  
Aug. 8, 2005   (EP) .................................. 05107272

(51) Int. Cl.  
*H02M 7/28* (2006.01)
(52) U.S. Cl. .............................. 363/61; 378/104; 363/59
(58) Field of Classification Search .................. 363/61, 363/59–60; 378/104, 101, 105, 111–112; 307/108  
See application file for complete search history.

(56) References Cited

U.S. PATENT DOCUMENTS

| 2,619,602 A | * | 11/1952 | Walker et al. | ................. 307/110 |
| 3,036,259 A | * | 5/1962 | Walter | ............................ 363/45 |
| 5,331,255 A | * | 7/1994 | Banbury et al. | ............... 315/411 |
| 5,680,431 A | * | 10/1997 | Pietras et al. | ................. 378/119 |

FOREIGN PATENT DOCUMENTS

| BE | 1013646 A |   | 5/2002 |
| JP | 55074375 A |   | 4/1980 |
| JP | 59175381 A | * | 10/1984 |
| JP | 63028270 A |   | 5/1988 |
| JP | 6340374 A |   | 10/1988 |
| JP | 63240374 A | * | 10/1988 |
| JP | 04178172 A |   | 6/1992 |
| WO | WO 2007017793 A1 | * | 2/2007 |

OTHER PUBLICATIONS

PCT/IB2006/052625, Peter Luerkens, Certified Priority Documents, World Intellectual Property Organization (WIPO), Received Aug. 22, 2006, pp. 1-45.*  
Henderson, A.: "Elektrische Netwerken"; Delftse Uitgevers Maatschappij, 3th Edition 1981, Chapter 2, Paragraph 7, pp. 54-57.

* cited by examiner

*Primary Examiner* — Harry Behm

(57) ABSTRACT

A voltage multiplier comprising a chain of multiplier stages, each multiplier stage (STGj) comprising first and second inputs (IP1j, IP2j) and first and second outputs (OP1j, 0P2j), which first and second outputs of a multiplier stage is coupled to respective first and second inputs of another multiplier stage, each multiplier stage (STGj) comprising a series diode arrangement of two diodes (D1j, D2j) coupled, in the same current conducting direction, between the first input (IP1j) and the first output (OP1j). Each multiplier stage (STGj) further comprises a first capacitor (C1j) coupled between the first input (IP1j) and the first output (OP1j), and a second capacitor (C2j) coupled between the second input (IP2j) and the second output (0P2j). Each multiplier stage (STGj) further comprises equalizing means (VLSj; C2j, C3j, C4j), preferably capacitors (Csj), for equalizing the current distributions, as a function of time, of the currents (Ij) through the diodes (D1j, D2j).

32 Claims, 14 Drawing Sheets

US 7,944,719 B2

VOLTAGE MULTIPLIER WITH IMPROVED POWER EFFICIENCY AND APPARATUS PROVIDED WITH SUCH VOLTAGE MULTIPLIER

The present invention relates in general to voltage multipliers for converting a relatively low AC-voltage into a relatively high DC-voltage. Such a voltage multiplier can be used in all kinds of equipments having a component or module which must be powered by a high DC-voltage. Such a component can for instance be a cathode ray tube in a television or a computer. Voltage multipliers are also used in laser and plasma generator applications.

More particularly, the present invention relates to X-ray apparatus which comprise an X-ray tube for generating X-rays, said X-ray tube needing a device for powering the X-ray tube with a high DC-voltage.

Voltage multipliers for converting a low AC-voltage into a high DC-voltage are widely used. The so-called "Cockroft and Walton" cascade rectifiers are used for several decades. Such a voltage multiplier is constructed by a series of rectifier diodes and capacitors to form a voltage multiplier i.e. a circuit that transforms an AC input voltage into an N-times higher DC-voltage, N being the number of rectifier stages. Such a voltage multiplier is for instance disclosed in FIG. 5 of the Japanese patent application JP3028270A wherein the first stage is composed of diodes D1 and D2, and capacitors C1 and C5; the second stage is composed of diodes D3 and D4, and capacitors C2 and C6, et cetera. Each stage increases the DC-voltage supplied by its previous stage except of the first stage which receives the AC-input voltage and generates a DC-voltage.

There is generally a need for developing voltage multipliers having a high power efficiency to avoid unnecessary power consumption and heat production. This is especially the case for portable applications. A main reason for poor power efficiency is the energy loss in the diodes, especially when a high operation frequency is used. In X-ray apparatus the DC-voltage needed for the X-ray tube is usually very high, e.g. 75 kV. In CT (Computer Tomography) applications a high power X-ray beam is needed for e.g. up to 20 seconds. This requires a so-called rotating anode tube, having its anode on ground potential and the cathode on e.g. −150 kV. Such a high voltage cannot reasonably be handled by the insulation of a transformer. Therefore voltage multipliers are applied leaving the transformer at a lower voltage, for instance 40 kV.

Ageing tubes suffer increasingly from tube arching which is a disruptive discharge caused by growing spurious gases and impurities in the tube. Usually an arching current is limited by resistors and detected by control electronics which can switch off the high voltage generator, e.g. the voltage multiplier. However the voltage multiplier has some output capacitance. In many cases this output capacitance is even increased on purpose by the addition of a smoothing capacitor to minimize the AC-ripple voltage in the DC-output voltage. Therefore, even if the voltage multiplier is switched off by the control electronics, the charge of the output capacitance causes a discharge current through the tube. This could still damage the tube. Therefore there is a need to reduce the output capacitance of the voltage multiplier. However this output capacitance can only be lowered if the operating frequency (thus the AC-input voltage of the multiplier) is increased. Otherwise the AC-ripple voltage would become too high. However, without additional measures, the power efficiency of the voltage multiplier would be reduced because of the increased operation frequency which causes increased energy losses in the diodes.

It is therefore an object of the invention to provide a voltage multiplier with increased power efficiency.

In an embodiment of the invention the voltage multiplier comprises a chain of multiplier stages, each multiplier stage comprising first and second inputs and first and second outputs, which first and second outputs of a multiplier stage is coupled to respective first and second inputs of another multiplier stage except for a last multiplier stage, which first and second inputs of a first multiplier stage constitute first and second inputs of the chain, each multiplier stage comprising a series diode arrangement of two diodes coupled, in the same current conducting direction, between the first input and the first output, and equalizing means for equalizing the current distributions, as a function of time, of the currents through the diodes.

The invention is based on the insight that in the conventional voltage multiplier the currents through the conducting diodes occur, approximately, one after each other. This leads to a waveform of sharp pulses which causes a considerable energy loss in the diodes. In the inventive voltage multiplier these pulses occur more or less simultaneously and are also less steep because they are spread out over time. As a consequence energy losses in the diodes are reduced which result in an increased power efficiency of the voltage multiplier.

In a further embodiment of the invention the voltage multiplier is characterized in that each multiplier stage comprises a first capacitor coupled between the first input and the first output, and a second capacitor coupled between the second input and the second output, and that in at least one of the multiplier stages the equalizing means comprises a time dependent voltage level-shifter coupled between the second output and a conjunction point of the two diodes, and in the remaining multiplier stages the equalizing means comprises an electrical coupling between the second output and a conjunction point of the two diodes.

The time dependent voltage level-shifters are preferably designed in a way that the average voltage is about zero, and thus the level-shifters are only functioning as a voltage drop for the AC-component of the diodes. For this reason the time dependent voltage level-shifters are preferably implemented by voltage level-shift capacitors. By doing so it is possible, if appropriately dimensioned, to cause equal current distributions, or even equal currents, through the conducting diodes in all the multiplier stages.

Although level-shift capacitors functioning as the time dependent voltage level-shifters are highly preferred other means can also function as a time dependent voltage level-shifter, e.g. a resistor biased by a time dependent current. It is to be noted that Japanese patent application JP63240374A discloses in FIG. 1 a voltage multiplier which is provided with resistors in the current paths to the diodes. These resistors are however not biased by a time-dependent current and thus do not function in the way as in the inventive voltage multiplier. Thus these resistors do not fall under the definition of a time dependent voltage level-shifter as used in the current invention. In JP63240374A the resistors only serve to reduce the rush currents through the diodes. Although this also helps a little bit to increase the power efficiency, the waveforms through the diodes are still steep and follow each other successively thereby causing a substantial amount of energy loss, in contrast to the inventive voltage multiplier.

In another further embodiment of the invention a group of three connected capacitors in a so-called "star arrangement" are replaced by three capacitors in a so-called "triangle arrangement". The function of the voltage multiplier is not changed if the three capacitors are dimensioned properly. How the dimensioning of the three capacitors in the "triangle arrangement" must be derived from the "star arrangement" is obvious since the so-called "star-triangle transformation" is a well known technique which is for instance described in the Dutch textbook: "ELEKTRISCHE NETWERKEN" by the author: ir. A. Henderson, published by "Delftse Uitgevers Maatschappij", 3th edition 1981, chapter 2, paragraph 7, pages 54-57.

In all embodiments of the invention a smoothing capacitor may optionally be added which is coupled between the first output of the last multiplier stage and the first input of the first multiplier stage.

The invention can be applied in both half wave and full wave voltage multipliers. If a full wave multiplier is used the capacitors coupled between the first output and the first input of a multiplier stage can be left out, especially when at the same time there is chosen for the option to add the smoothing capacitor.

The invention will be described in more detail with reference to the accompanying drawings, in which.

Figure 14:
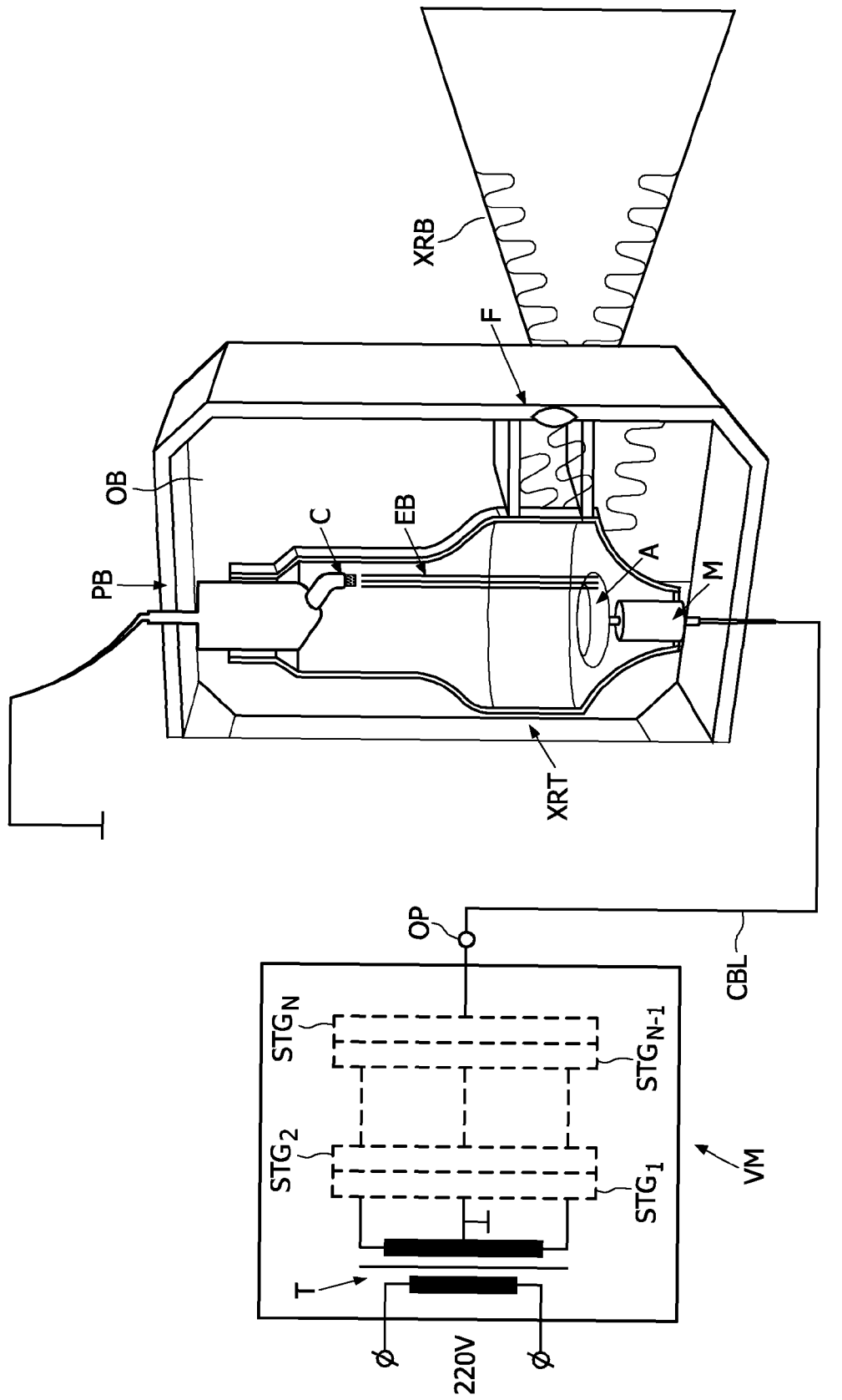
Figure 15:
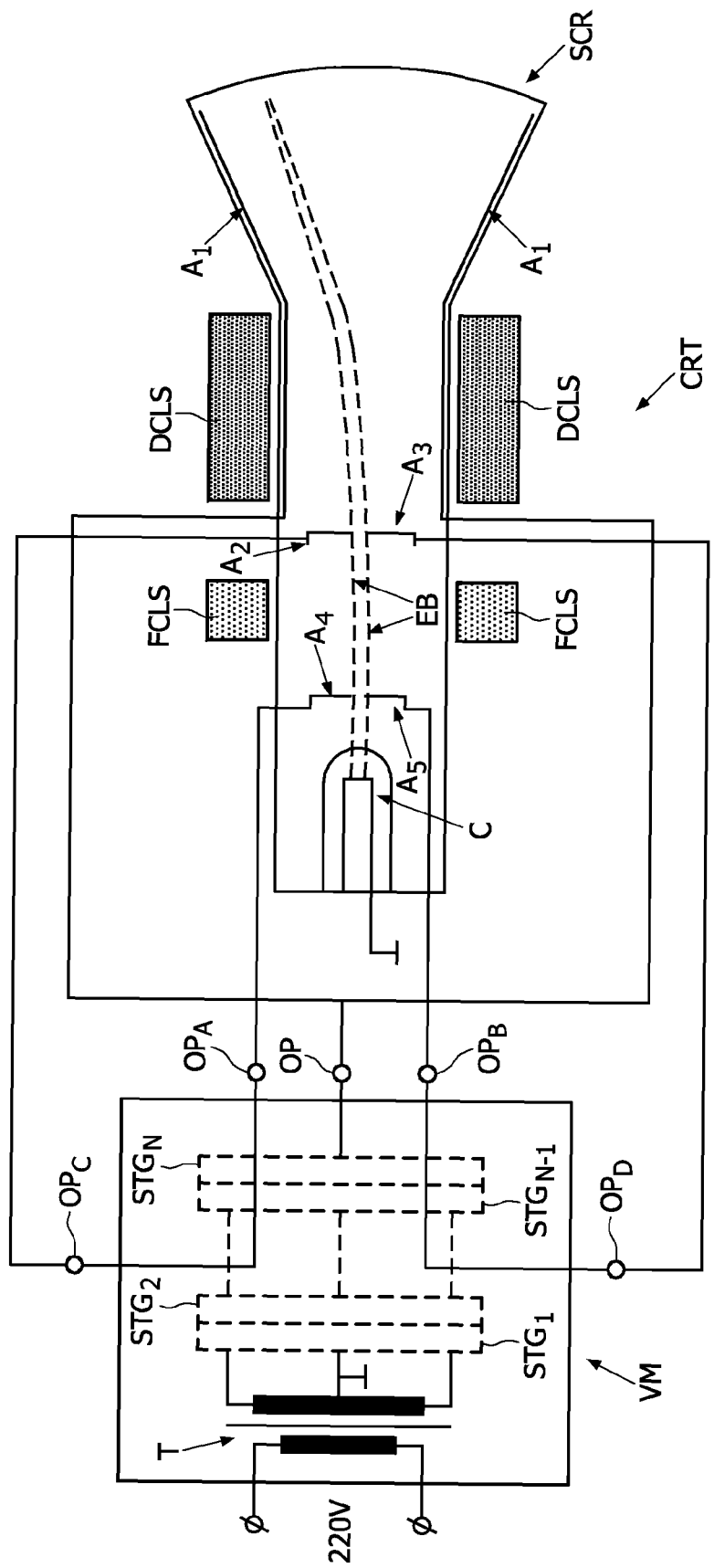

FIG. 14 shows a schematic of an X-ray apparatus comprising a device for generating a high voltage which comprises the inventive voltage multiplier for supplying a high voltage between an anode and a cathode of an X-ray tube; and FIG. 15 shows a schematic of an apparatus comprising a cathode ray tube for generating an image on a screen which comprises a device for generating a high voltage which comprises the inventive voltage multiplier for supplying one or more high voltages between electrodes of the cathode ray tube.

In these figures parts or elements having like functions or purposes bear the same reference symbols. So for instance the first capacitor $C_{21}$ of stage $STG_1$ in FIG. 9 has the same function as the second capacitor $C_{21}$ of stage $STG_1$ in FIG. 5.

Figure 1:
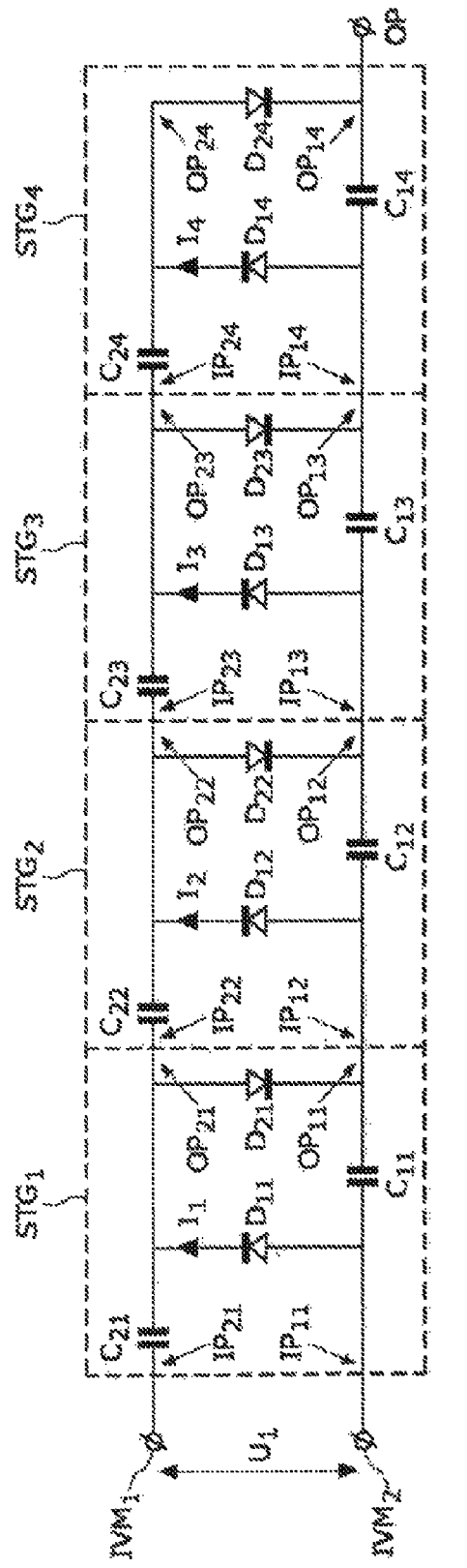
FIG. 1 shows a conventional half wave voltage multiplier.

FIG. 1 shows a conventional half wave voltage multiplier VM which comprises in general a chain of N multiplier stages $STG_1$-$STG_N$.

Throughout the application an integer j is used to refer to a specific stage (stage $STG_j$). Thus for instance capacitor $C_{1j}$ is in general an indication of capacitor $C_1$ in the $j^{th}$ stage $STG_j$, and more specifically $C_{11}$ (j=1) means capacitor $C_1$ in the $1^{th}$ stage $STG_1$, $C_{12}$ (j=2) means capacitor $C_1$ in $2^{th}$ stage $STG_2$, $C_{1N}$ (j=N) means capacitor $C_N$ in $N^{th}$ (=last) stage $STG_N$, and so on. Henceforth the integer N will be 4 throughout the description to the Figures by way of example. The integer N can however be chosen freely. The appropriate value for N should be chosen in accordance with the amplitude of an AC input voltage $U_1$ between first and second inputs $IVM_1$, $IVM_2$ of the chain and the desired value of a DC-output voltage on a node of the chain. This node can for instance be the output OP of the chain.

Each stage $STG_j$ comprises first and second inputs $IP_{1j}$, $IP_{2j}$ and first and second outputs $OP_{1j}$, $OP_{2j}$. The first and second inputs $IP_{11}$, $IP_{21}$ of the first stage $STG_1$ constitute the inputs $IVM_1$, $IVM_2$. The first and second outputs $OP_{1j}$, $OP_{2j}$ of a stage $STG_j$ is connected to respective first and second inputs $IP_{1j}$, $IP_{2j}$ of another stage $STG_j$ except for the last stage $STG_4$. Each multiplier stage $STG_j$ comprises a first capacitor $C_{1j}$ which is connected between the first input $IP_{1j}$ and the first output $OP_{1j}$, and a second capacitor $C_{2j}$ which is connected between the second input $IP_{2j}$ and the second output $OP_{2j}$. Each multiplier stage $STG_j$ further comprises a series diode arrangement of two diodes $D_{1j}$, $D_{2j}$ which is connected between the first input $IP_{1j}$ and the first output $OP_{1j}$. For instance in the first stage $STG_1$ a first diode $D_{11}$ is connected with its anode to the first input $IP_{11}$ and with its cathode to the anode of a second diode $D_{21}$. The cathode of the second diode $D_{21}$ is connected with the output $OP_{11}$. The anodes and cathodes of $D_{11}$ and $D_{21}$ may also all be reversed. The diodes $D_{11}$ and $D_{21}$ should have the same current conducting direction. Thus the conjunction point of the diode series arrangement of $D_{11}$ and $D_{21}$ is always formed by an anode and a cathode of $D_{11}$ and $D_{21}$. The same applies for all the other stages $STG_j$. Moreover the current conducting directions of all the diodes in the voltage multiplier VM should be equal. It basically means that all the diodes in the voltage multiplier VM are connected in series in the same current conducting direction. The current through the first diode $D_{1j}$ in each stage $STG_j$ is indicated by $I_j$. In each stage $STG_j$ the conjunction point of the series diode arrangement is connected with the first output $OP_{2j}$.

The principle of operation of this half wave voltage multiplier VM is generally known from the prior art. Briefly summarized the operation is as follows. Assume that a periodic AC-input voltage $U_1$ is available between the first and second inputs $IVM_1$, $IVM_2$. This input voltage is usually sinusoidal. However also other waveforms can be used. If, in the example of FIG. 1, the potential (voltage) at the second input $IVM_2$ is higher than the potential at the first input $IVM_1$, diode $D_{11}$ will conduct current and as a consequence the capacitor $C_{21}$ will be charged. When the top value of the potential at the second input $IVM_2$ is reached, $C_{21}$ will be fully charged. Then the voltage on $IVM_2$ will start lowering. As a consequence $D_{11}$ will become non-conducting because the voltage across $C_{21}$ will, initially, remain constant. Moreover at the same time that the potential at $IVM_2$ lowers, the potential at $IVM_1$ increases. So after half a time period of the periodic AC-input voltage $U_1$, the potentials at the inputs $IVM_1$ and $IVM_2$ are reversed, i.e. the potential at $IVM_1$ has reached the top value, and the potential at $IVM_2$ has reached the minimum value (negative top value). During the last half-period of the potential reversing process diode $D_{21}$ was conducting and transferring part of the charge of $C_{21}$ to $C_{11}$. After numerous periods of the periodic AC-input voltage $U_1$, the voltage multiplier VM has reached the so called "steady state" and all the first capacitors $C_{1j}$ and all the second capacitors $C_{2j}$ will be fully charged. The voltages across each first capacitor will be approximately equal to twice the peak-to-peak value of the AC-input voltage $U_1$. Therefore since in FIG. 1 four stages (N=4) are used, the DC-output voltage between the output OP and the second input $IVM_2$ of the voltage multiplier VM will be approximately equal to eight times the peak-to-peak value of the AC-input voltage $U_1$.

In the above explanation it was assumed that the voltage multiplier VM was not coupled to an output load. If for instance an X-ray tube is coupled to e.g. the output OP then the voltages on the capacitors will decrease and consequently the output voltage at the output OP will decrease. The output voltage will then also be burdened with a ripple. The output voltage decreases and at the same time the ripple voltage increases with increasing output (load) current. However the higher the values of both the first and second capacitor $C_{1j}$, $C_{2j}$ in each stage $STG_j$ the less the output voltage decreases and the less the ripple voltage increases. However for i.a. weight reasons of the voltage multiplier the capacitance values should not be chosen higher than necessary.

Figure 2:
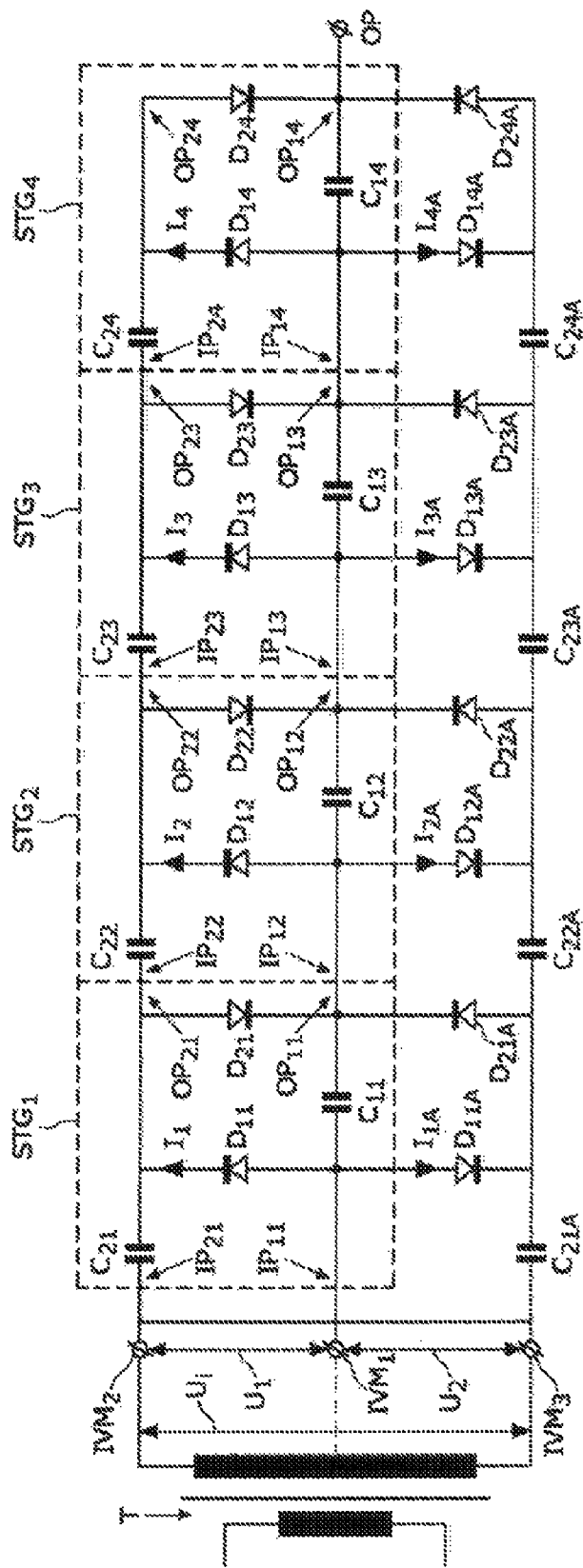
FIG. 2 shows a conventional full wave voltage multiplier.

FIG. 2 shows a conventional full wave voltage multiplier VM. It basically comprises two half-wave voltage multipliers which are merged together thereby sharing the first capacitor $C_{1j}$ in each stage $STG_j$. The stages $STG_j$ (which correspond to FIG. 1) are indicated with dashed rectangles. In addition to the embodiment of FIG. 1 each stage $STG_j$ comprises a further series diode arrangement of two diodes $D_{1jA}$, $D_{2jA}$, and a third capacitor $C_{2jA}$. An element having a reference sign which finishes with the character "A" corresponds to and has similar function as a corresponding element having a like reference sign but without the finishing character "A". Thus for instance diode $D_{11A}$ has similar function as the diode $D_{11}$.

This full wave voltage multiplier VM comprises a third input $IVM_3$. In FIG. 2 a transformer T is shown having a primary winding and a secondary winding. This transformer T is used to transform an AC-voltage, between the terminals of the primary winding (not shown in FIG. 2), to an AC input voltage $U_i$ between the second input $IVM_2$ and the third input $IVM_3$ of the voltage multiplier VM. The AC input voltage $U_i$ is preferably chosen as high as possible but not so high that the insulation of the transformer T can not handle it. The voltage multiplier VM further transforms this AC input voltage $U_i$ to an even higher, and also rectified, output voltage at for instance the output terminal OP.

An advantage of the full wave voltage multiplier compared to the half wave voltage multiplier is that the ripple in the output voltage is reduced. Optionally the secondary winding of the transformer T may be provided with a midpoint which is connected (indicated by dashed lines) to the first input $IVM_1$. If this midpoint is used as reference voltage e.g. by grounding it, the maximum absolute voltage on any point in the secondary winding is never higher than half the peak-to-peak voltage of the AC input voltage $U_i$. This is advantage with respect to the insulation of the transformer T. The voltage difference between the second input $IVM_2$ and the first input $IVM_1$ is indicated by $U_1$ and the voltage difference between the first input $IVM_1$ and the third input $IVM_3$ is indicated by $U_2$.

Figure 3:
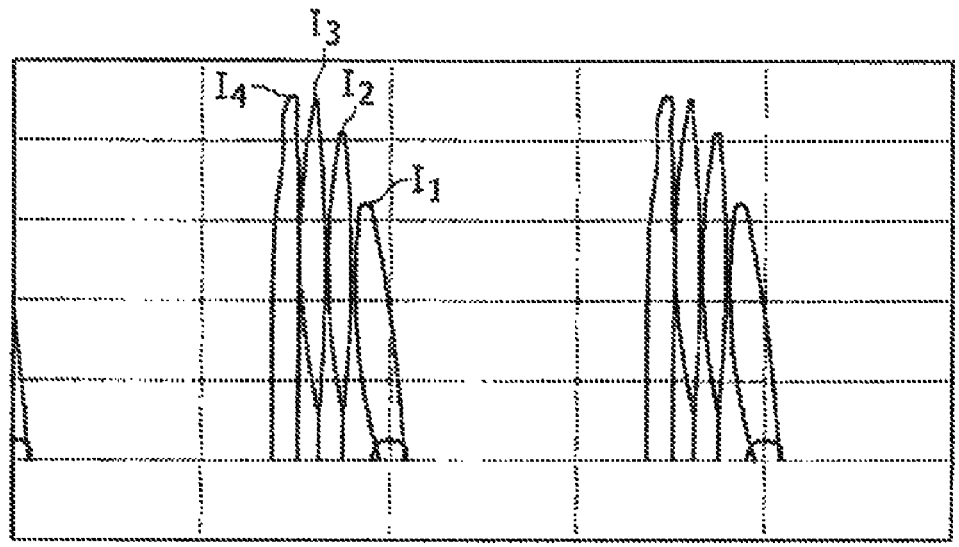
FIG. 3 shows a diagram of the electrical currents through the diodes of the conventional half wave voltage multiplier according to FIG. 1 or through the diodes of the upper or under half of the full wave voltage multiplier of FIG. 2.

FIG. 3 shows a diagram of the electrical currents through the diodes of the conventional half wave voltage multiplier VM according to FIG. 1 or through the diodes of the upper or under half of the full wave voltage multiplier VM of FIG. 2. So by way of example and referring to FIG. 1, the currents $I_1$, $I_2$, $I_3$, and $I_4$ through respectively diodes $D_{11}$, $D_{12}$, $D_{13}$, and $D_{14}$ are indicated in FIG. 3 in the situation that the voltage multiplier VM has reached its steady state. As is clear form FIG. 3 the currents $I_1$, $I_2$, $I_3$, and $I_4$ more or less succeed each other and together form a waveform of sharp pulses which causes a considerable energy loss in the diodes $D_{11}$, $D_{12}$, $D_{13}$, and $D_{14}$. This waveform of sharp pulses occurs during one half of the AC input voltage $U_i$ in which the voltage on the second input $IVM_2$ is higher than the voltage on the first input $IVM_1$. During the other half of the AC input voltage $U_i$ in which the voltage on the first input $IVM_1$ is higher than the voltage on the second input $IVM_2$, a similar waveform of sharp pulses occurs caused by more or less succeeding currents (not indicated in the Figures) through respectively the diodes $D_{21}$, $D_{22}$, $D_{23}$, and $D_{24}$.

Figure 5:
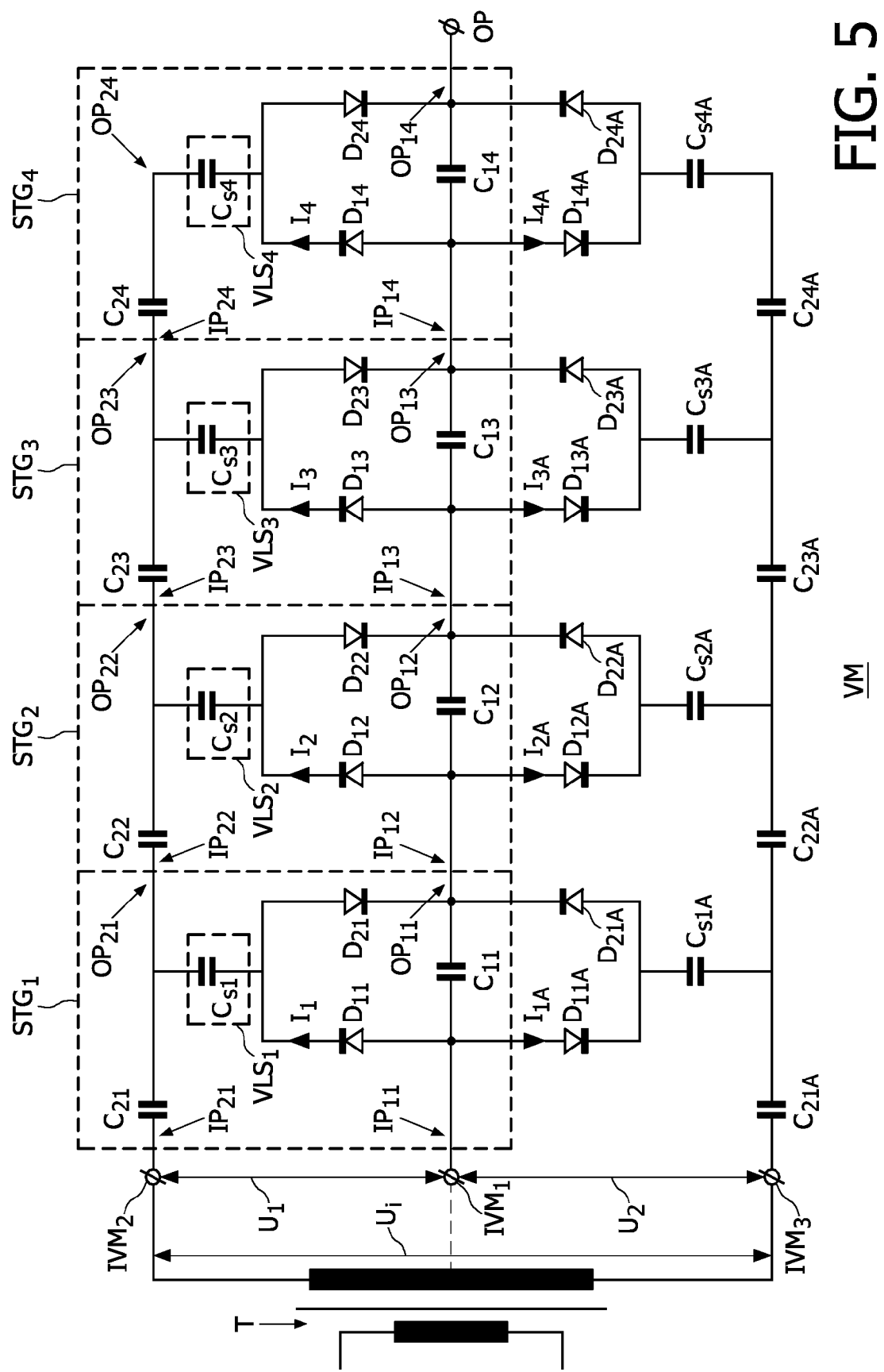
FIG. 5 shows an electrical schematic of a first inventive embodiment of a half wave or full wave voltage multiplier (corresponding to claim 2) provided with voltage level-shift capacitors in the current paths to the diodes.

FIG. 5 shows an electrical schematic of a first inventive embodiment of a half wave or full wave voltage multiplier VM. The difference with the schematic of FIG. 2 is that the voltage multiplier VM in addition comprises equalizing means for equalizing the current distributions, as a function of time, of the currents $I_j$ through the diodes $D_{1j}$, $D_{2j}$ and in case of the full wave version the equalizing means may also equalize the current distributions, as a function of time, of the currents $I_{jA}$ through the diodes $D_{1jA}$, $D_{2jA}$. In the following, by way of example, the functioning of this circuit is explained by referring only to the half-wave voltage multiplier VM indicated inside the dashed rectangles. The equalizing means comprises, preferably in each stage $STG_j$, a time dependent voltage level-shifter $VLS_j$ coupled between the second output $OP_{2j}$ and a conjunction point of the two diodes $D_{1j}$, $D_{2j}$. Preferably, and most easily, the time dependent voltage level-shifter $VLS_j$ is implemented by a voltage level-shift capacitor $C_{sj}$. Although recommended, it is not strictly necessary to put in a voltage level-shift capacitor $C_{sj}$ in every stage in order to get an enhanced power efficiency with respect to the conventional voltage multipliers.

Figure 6:
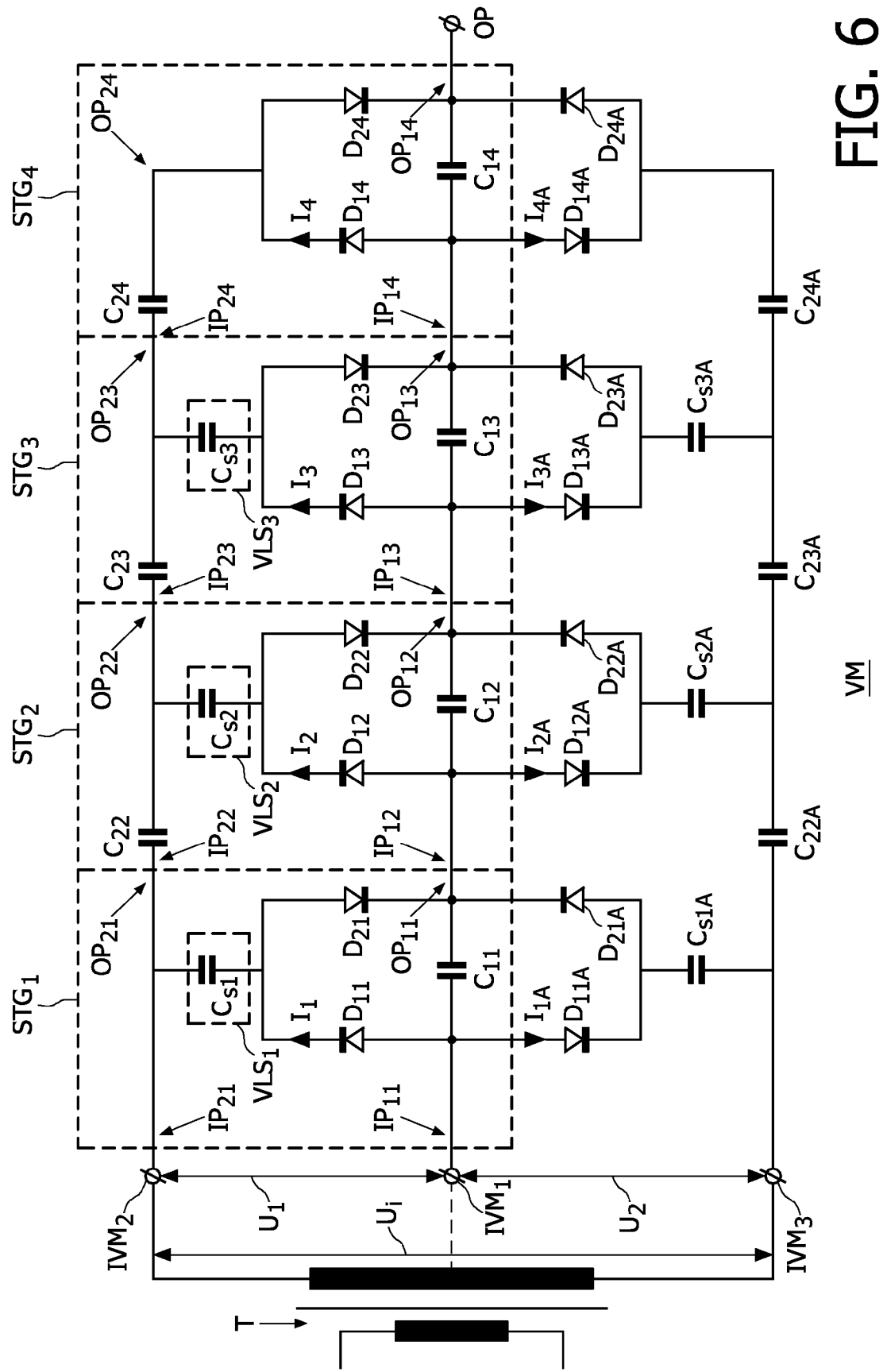
FIG. 6 shows an electrical schematic of a second inventive embodiment of a half wave or full wave voltage multiplier (corresponding to claim 3) having a reduced number of capacitors compared to the first embodiment.

FIG. 6 shows an electrical schematic of a second inventive embodiment of a half wave or full wave voltage multiplier having a reduced number of capacitors compared to the first embodiment. The difference with the first embodiment as shown in FIG. 5 is that in the first stage $STG_1$ the second capacitor $C_{21}$ is replaced by an electrical connection and in the last stage $STG_4$ the voltage level-shift capacitor $C_{s4}$ is also replaced by an electrical connection. For the last stage $STG_4$ it means that the second capacitor $C_{24}$ takes over the function of the level-shift capacitor $C_{s4}$ (in FIG. 5). The operation of the circuits of FIGS. 5 and 6 are similar.

Figure 4:
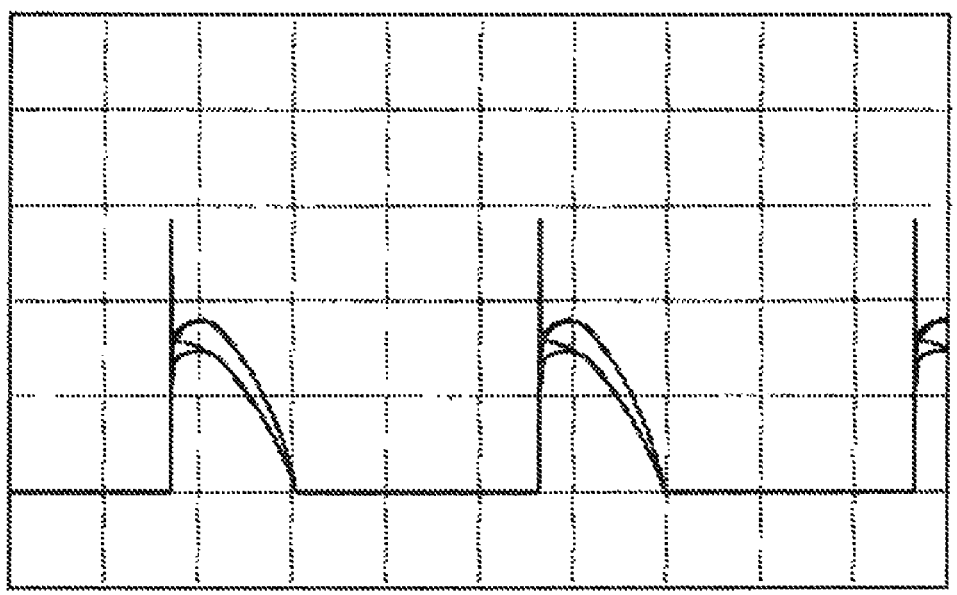
FIG. 4 shows a diagram of the electrical currents through the diodes of a half wave voltage multiplier according to the invention or through the diodes of the upper or under half of a full wave voltage multiplier according to the invention.

By way of example the dimensioning of the voltage level-shift capacitors $C_{sj}$ is explained with reference to FIG. 6. It is assumed that all the diodes have approximately the same I-V characteristics since this leads to the best results. In the explanation it is assumed that currents are flowing through the diodes $D_{11}$, $D_{12}$, $D_{13}$, and $D_{14}$ during one half-period of the AC input voltage $U_i$. (During the other half-period of the AC input voltage $U_i$ the diodes $D_{21}$, $D_{22}$, $D_{23}$, and $D_{24}$ are conducting current in stead of the diodes $D_{11}$, $D_{12}$, $D_{13}$, and $D_{14}$, calculations during this half-period of the AC input voltage $U_i$ will lead to the same results.) For getting the best enhancement in power efficiency it is the desire to transform the sharp waveform of pulses as indicated in FIG. 3 into a less sharp wave form of pulses wherein the currents $I_j$ occur approximately in the same time instant, see FIG. 4. With regard to the currents $I_j$ equation [1] is valid:

$$\forall j: I_j = I \qquad [1]$$

As a consequence the currents through capacitors $C_{24}$, $C_{s3}$, $C_{s2}$, and $C_{s1}$ equal I, the current through capacitor $C_{23}$ equals 2 I, and the current through capacitor $C_{22}$ equals 3 I. Further as a consequence of equation [1] the voltage drops across the diodes $D_{11}$, $D_{12}$, $D_{13}$, and $D_{14}$ are equal. With above mentioned information complemented with the general known physical laws (especially with Kirchoff's 1st and 2st Laws) any person skilled in electronics can calculate the required relation between the capacitors $C_{sj}$ and the capacitors $C_{2j}$.

Especially for X-ray applications a high dynamic response of the voltage multiplier is preferred. This dynamic response can be optimized by balancing the ripple voltages across the capacitors $C_{2j}$. This can be done by choosing a same capacitor value C for each capacitor $C_{2j}$ as expressed in equation [2]:

$$\forall j: C_{2j} = C \qquad [2]$$

Under the assumption of equation [2] a general equation for the capacitor $C_{sj}$ can be derived and is shown in equation [3]:

$$\forall\, j1 \leq j \leq N-1:\; C_{sj} = \frac{C}{\sum_{k=j}^{N-1}(N-k)} \qquad [3]$$

If for instance N=4 (four stages are used as in the Figures) the following equation [4] results from equation [3]:

$$\forall\, j1 \leq j \leq 3:\; C_{sj} = \frac{C}{\sum_{k=j}^{C}(4-k)} \qquad [4]$$

which results in the following values for capacitors $C_{sj}$:

$$j = 3 \Rightarrow C_{s3} = C$$
$$j = 2 \Rightarrow C_{s2} = \frac{C}{3}$$
$$j = 1 \Rightarrow C_{s1} = \frac{C}{6}$$

Figure 7:
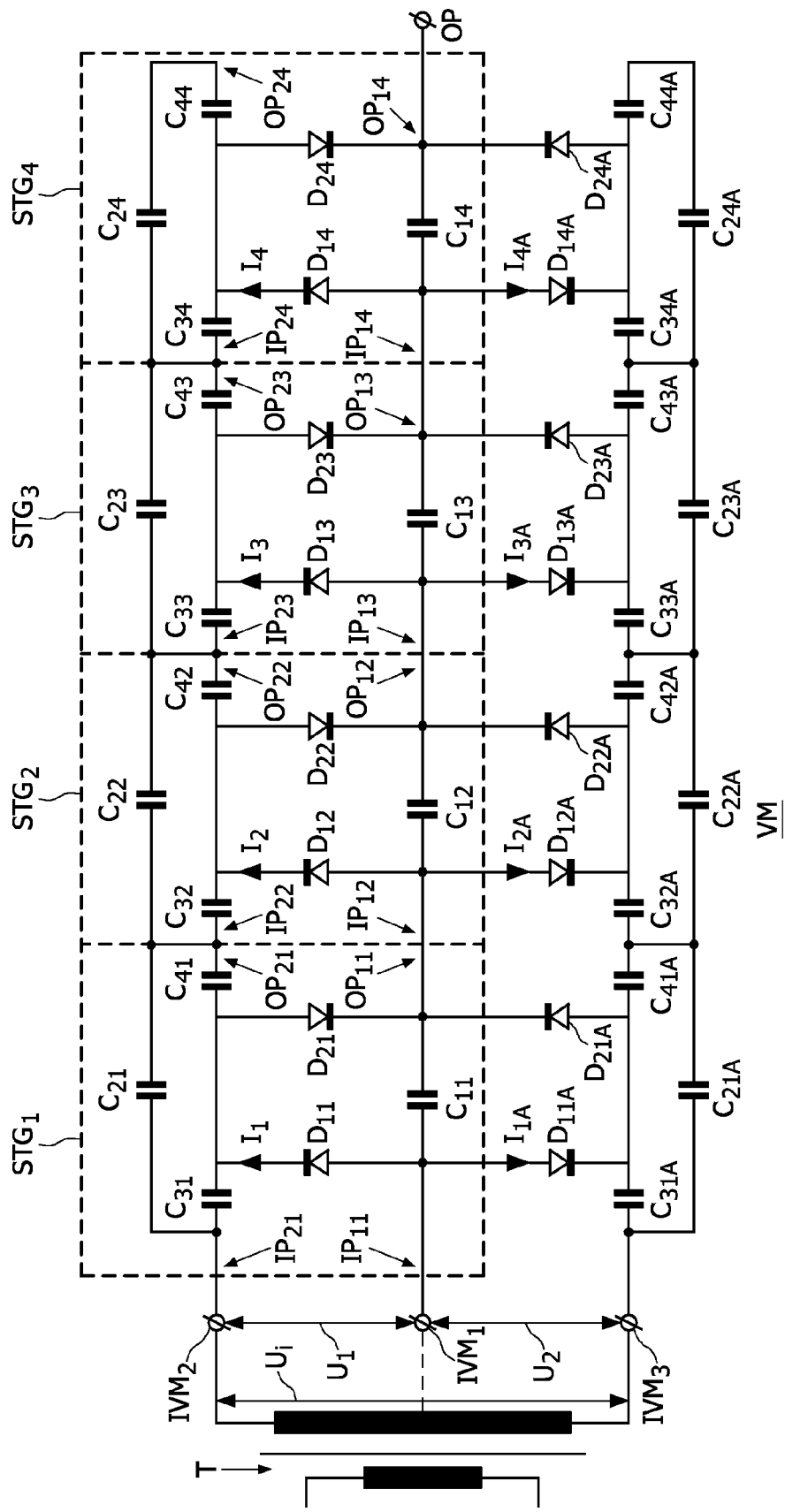
FIG. 7 shows an electrical schematic of a third inventive embodiment of a half wave or full wave voltage multiplier (corresponding to claim 4) which differs from the first embodiment in that so-called "star-triangle transformations" for groups of three connected capacitors are applied.

FIG. 7 shows an electrical schematic of a third inventive embodiment of a half wave or full wave voltage multiplier VM. It differs (for the half wave multiplier) with the first embodiment as shown in FIG. 5 in that in each stage $STG_j$ the capacitors $C_{sj}$ are replaced by a series capacitor arrangement of a third and a fourth capacitor $C_{3j}$, $C_{4j}$ connected between the second input $IP_{2j}$ and the second output $OP_{2j}$ and that a conjunction point of the series capacitor arrangement is connected to the conjunction point of the series diode arrangement.

As previously stated it is generally known (see e.g. "ELEKTRISCHE NETWERKEN") how a group of three connected capacitors in a so-called "star arrangement" can be replaced by three capacitors in a so-called "triangle arrangement". From FIG. 5 it is clear that e.g. capacitors $C_{21}$, $C_{s1}$, and $C_{22}$ form a "star arrangement" which can be transformed into a "triangle arrangement" formed by the capacitors $C_{21}$, $C_{31}$, and $C_{41}$ in FIG. 7. However capacitors $C_{21}$, $C_{s1}$, and $C_{22}$ (FIG. 5) are not all in the same stage. This makes it difficult to make the transformations for all the capacitors $C_{2j}$ and $C_{sj}$, since then for instance the second stage would only be left with the capacitor $C_{s2}$. Therefore generally the preferred way to perform the translations is to split (just in mind) each capacitor $C_{2j}$ into a series arrangement of two capacitors wherein the respective series arrangement has the same substitution value of the total capacitance as the capacitance of the "original" single capacitor $C_{2j}$. Although not necessary it is preferred and most convenient to use (just in mind) two capacitors in series each having twice the capacitance value of the "original" single capacitor $C_{2j}$. Then it can be easily seen that each stage $STG_j$ in FIG. 5 can be thought of comprising a "star arrangement" which can easily be transformed into a "triangle arrangement" (see FIG. 7). Special attention is needed for the first stage $STG_1$ in which it is not appropriate to split (just in mind) capacitor $C_{21}$ into two parts, because capacitor $C_{21}$ is not connected to another stage but to the second input $IVM_2$. Also special attention is needed for the last stage $STG_4$ which has of course no connection to a higher order stage. Thus the "missing" capacitor should (just in mind) be added and to be connected with one end to the conjunction point of capacitor $C_{24}$ and capacitor $C_{s4}$, and the other end leaving unconnected.

Figure 8:
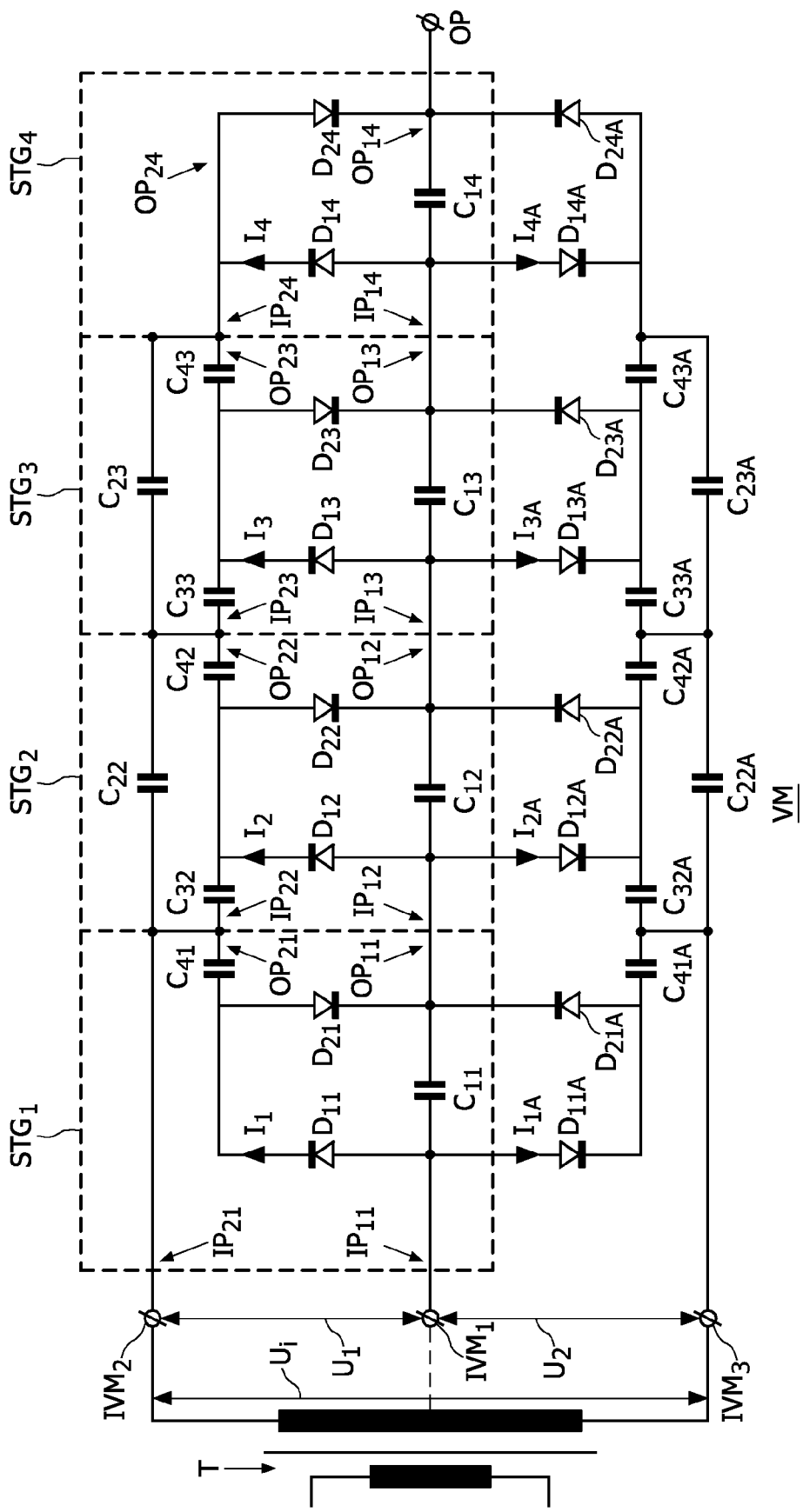
FIG. 8 shows an electrical schematic of a fourth inventive embodiment of a half wave or full wave voltage multiplier (corresponding to claim 5) having a reduced number of capacitors compared to the third embodiment.

FIG. 8 shows an electrical schematic of a fourth inventive embodiment of a half wave or full wave voltage multiplier having a reduced number of capacitors compared to the third embodiment as shown in FIG. 7. The difference with the third embodiment as shown in FIG. 7 is that in the first stage $STG_1$ the capacitors $C_{21}$ and $C_{31}$ are left out, and an electrical connection is made between the second input $IP_{21}$ and the second output $OP_{21}$, and in the last stage $STG_4$ the capacitors $C_{24}$, $C_{34}$, and $C_{44}$ are left out, and an electrical connection is made between the second input $IP_{24}$, the second output $OP_{24}$, and the conjunction point of the series diode arrangement. A skilled person in electronics is able and may, if necessary, adapt the values of the capacitors, in order to again acquire the optimum enhancement in power efficiency under the same principles as explained previously with reference to the equations [1] and [2].

Figure 9:
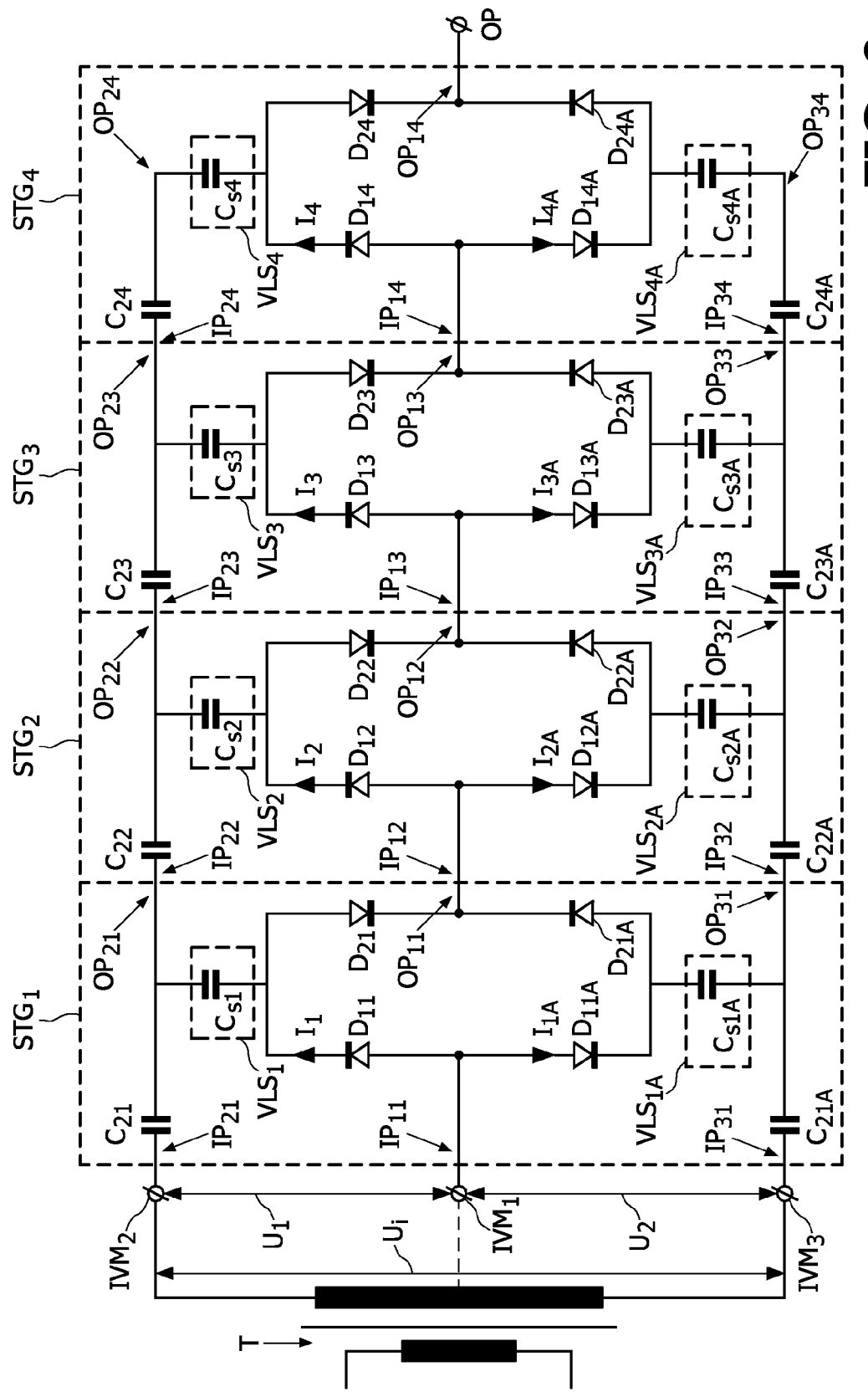
FIG. 9 shows an electrical schematic of a fifth inventive embodiment of a full wave voltage multiplier (corresponding to claim 6)

FIG. 9 shows an electrical schematic of a fifth inventive embodiment of a full wave voltage multiplier VM. A difference with the first embodiment as shown in FIG. 5 is that in this fifth embodiment the first capacitors $C_{1j}$ of FIG. 5 are left out in FIG. 9. This is however only possible in a full wave voltage multiplier. (Compare the dashed rectangles of FIG. 9 with the dashed rectangles of FIG. 5.) Therefore in FIG. 9 each multiplier stage $STG_j$ also comprises the diodes $D_{1j,A}$ and $D_{2j,A}$ of the further series diode arrangement and a further level-shift capacitors $C_{s1,A}$. The advantage of the fifth embodiment over the second embodiment is the reduction in size and weight of a full wave voltage multiplier VM. For the purpose of claim 6 in each stage $STG_j$ now capacitor $C_{2j}$ is referred to as the first capacitor, and capacitor $C_{2j,A}$ is referred to as the second capacitor.

Figure 10:
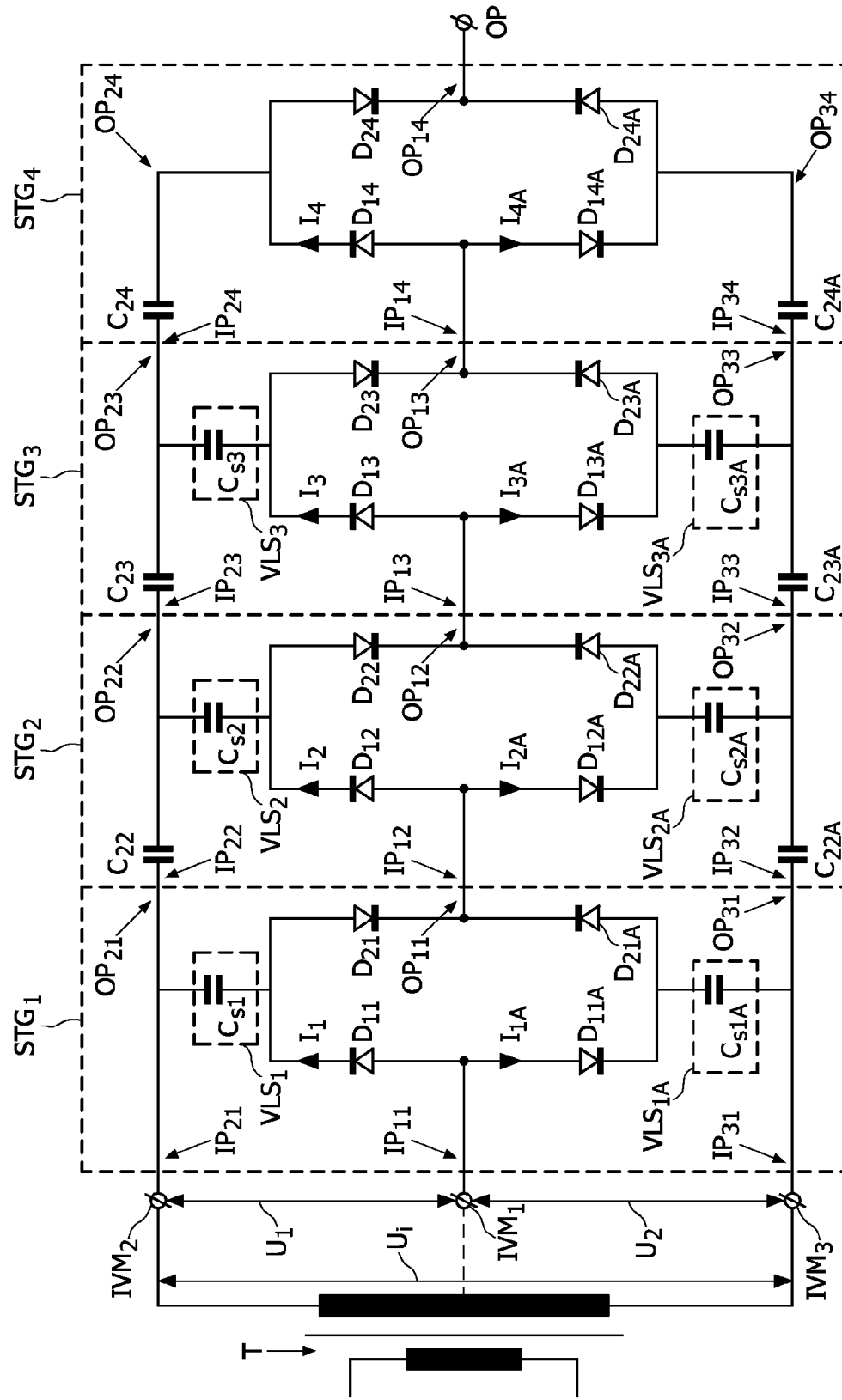
FIG. 10 shows an electrical schematic of a sixth inventive embodiment of a full wave voltage multiplier (corresponding to claim 7) having a reduced number of capacitors compared to the fifth embodiment.

FIG. 10 shows an electrical schematic of a sixth inventive embodiment of a full wave voltage multiplier having a reduced number of capacitors compared to the fifth embodiment. The difference with the fifth embodiment as shown in FIG. 9 is that in the first stage $STG_1$ the first capacitor $C_{21}$ is replaced by an electrical connection, the second capacitor $C_{21A}$ is replaced by an electrical connection, and in the last stage $STG_4$ the voltage level-shift capacitor $C_{s4}$ is replaced by an electrical connection, and the further level-shift capacitor $C_{s4A}$ is replaced by an electrical connection. For the last stage $STG_4$ it means that the first capacitor $C_{24}$ takes over the function of the level-shift capacitor $C_{s4}$ (in FIG. 9), and the second capacitor $C_{24A}$ takes over the function of the further level-shift capacitor $C_{s4A}$ (in FIG. 9). The operation of the circuits of FIGS. 9 and 10 are similar.

Figure 11:
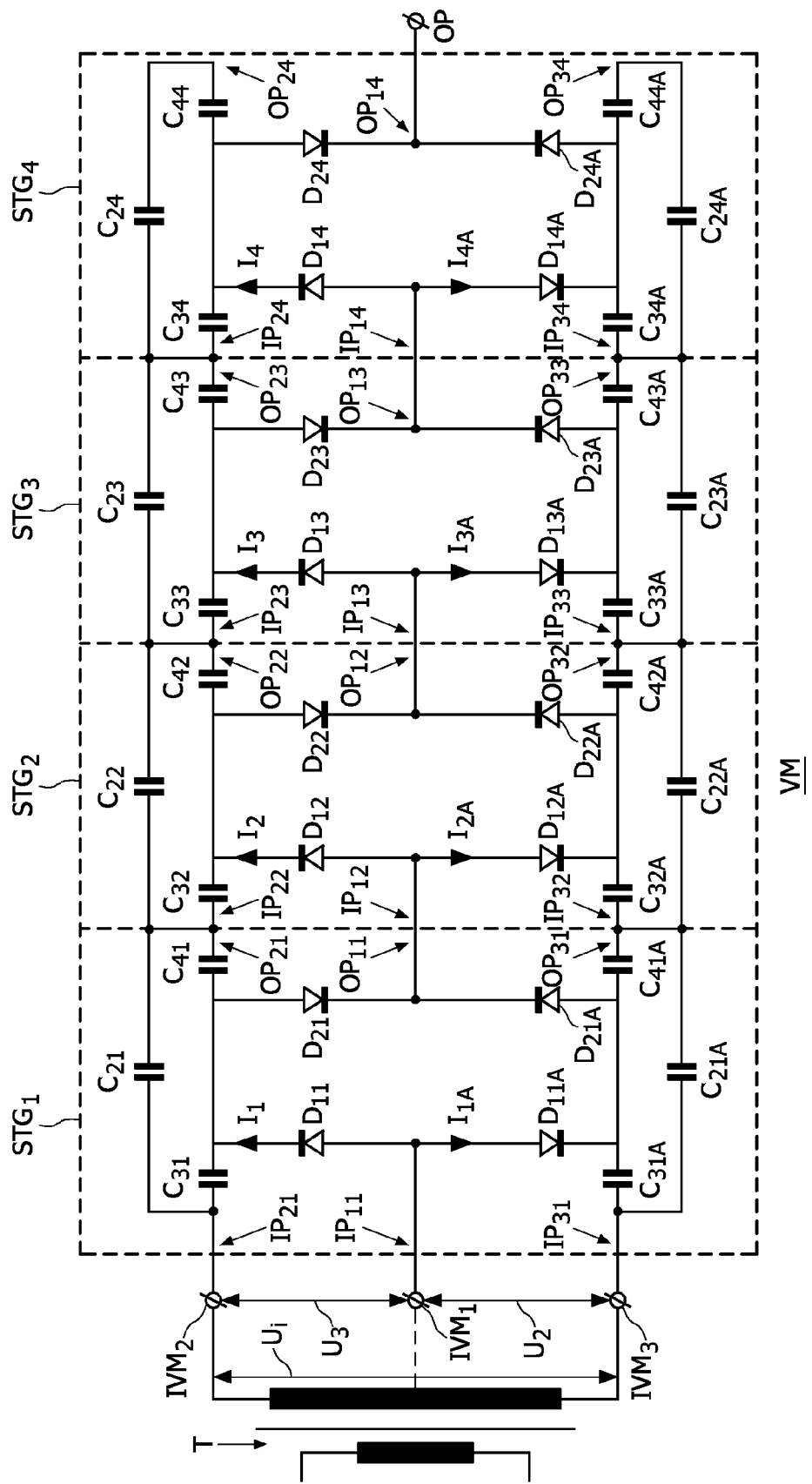
FIG. 11 shows an electrical schematic of a seventh inventive embodiment of a full wave voltage multiplier (corresponding to claim 8) which differs from the fifth embodiment in that so-called "star-triangle transformations" for groups of three connected capacitors are applied.

FIG. 11 shows an electrical schematic of a seventh inventive embodiment of a full wave voltage multiplier. The difference with the third embodiment as shown in FIG. 7 is that in this seventh embodiment the first capacitors $C_{1j}$ of FIG. 7 are left out in FIG. 11. This is however only possible in a full wave voltage multiplier. Therefore in FIG. 11 each multiplier stage $STG_j$ must also comprise diodes $D_{1jA}$ and $D_{2jA}$ of the further series diode arrangement and the capacitors $C_{3jA}$ and $C_{4jA}$ of the further series capacitor arrangement. (Compare the dashed rectangles of FIG. 11 with the dashed rectangles of FIG. 7.) The advantage of the seventh embodiment over the third embodiment is the reduction in size and weight of a full wave voltage multiplier VM. For the purpose of claim 8 in each stage $STG_j$ now capacitor $C_{2j}$ is referred to as the first capacitor, capacitor $C_{2jA}$ is referred to as the second capacitor, capacitor $C_{3j}$ is referred to as the third capacitor, capacitor $C_{4j}$ is referred to as the fourth capacitor, capacitor $C_{3jA}$ is referred to as the fifth capacitor, and capacitor $C_{4jA}$ is referred to as the sixth capacitor.

Figure 12:
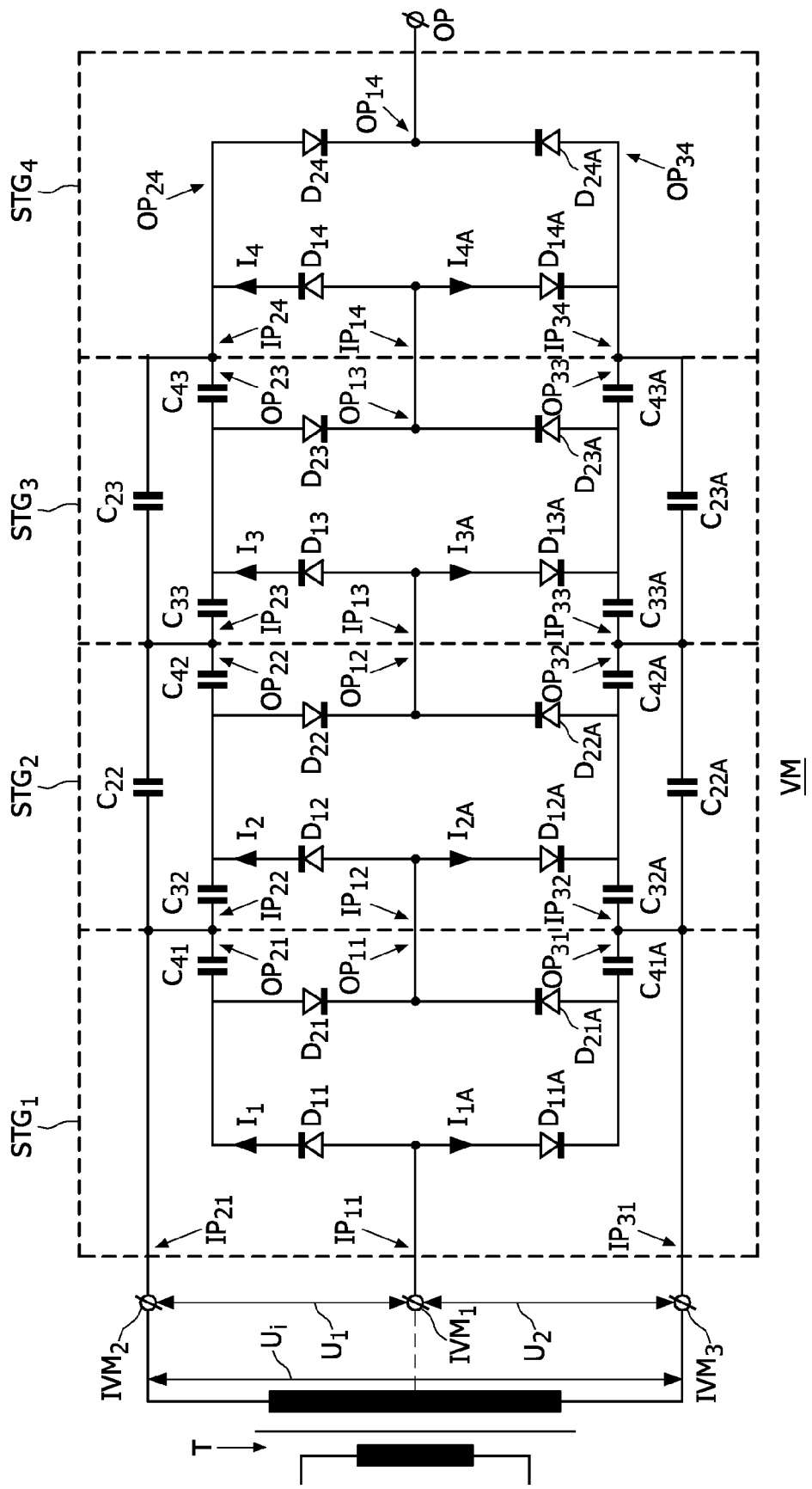
FIG. 12 shows an electrical schematic of an eight inventive embodiment of a full wave voltage multiplier (corresponding to claim 9) having a reduced number of capacitors compared to the seventh embodiment.

FIG. 12 shows an electrical schematic of an eight inventive embodiment of a full wave voltage multiplier. The difference with the seventh embodiment as shown in FIG. 11 is that in the first stage $STG_1$ the capacitors $C_{21}$, $C_{31}$, $C_{21A}$, and $C_{31A}$ are left out, an electrical connection is made between the second input $IP_{21}$ and the second output $OP_{21}$, and an electrical connection is made between the third input $IP_{31}$ and the third output $OP_{31}$, and in the last stage $STG_4$ the capacitors $C_{24}$, $C_{34}$, $C_{44}$, $C_{24A}$, $C_{34A}$, and $C_{44A}$ are left out, an electrical connection is made between the second input $IP_{24}$, the second output $OP_{24}$, and the conjunction point of the series diode arrangement, and an electrical connection is made between the third input $IP_{34}$, the third output $OP_{34}$, and the conjunction point of the further series diode arrangement. A skilled person in electronics is able and may, if necessary, adapt the capacitors, in order to again acquire the optimum enhancement in power efficiency under the same principles as explained previously with reference to the equations [1] and [2].

Figure 13:
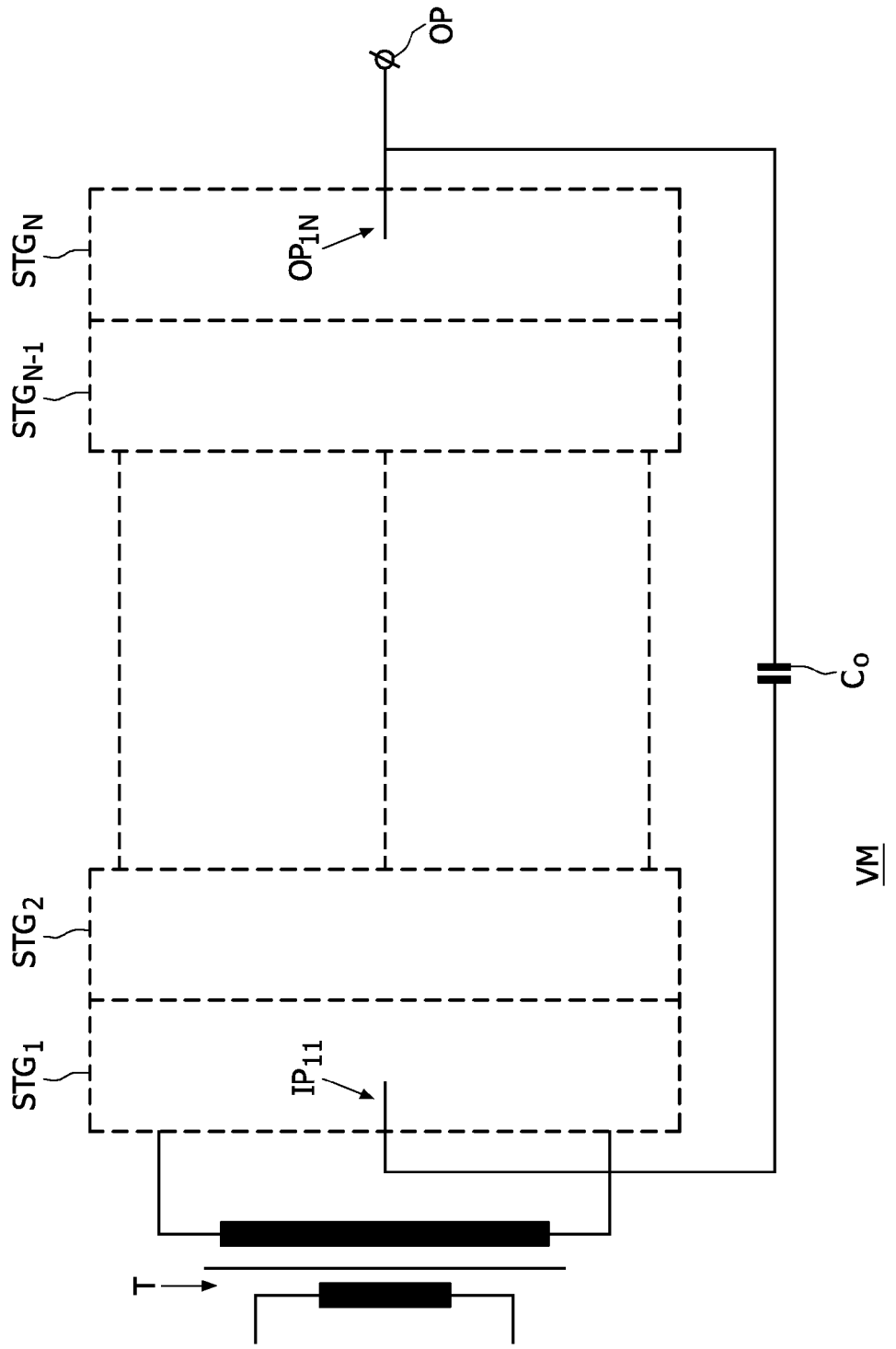
FIG. 13 shows a schematic of a ninth inventive embodiment of a half wave or full wave voltage multiplier, having N stages, provided with a smoothing capacitor coupled between an output of the last multiplier stage and an input of the first multiplier stage.

FIG. 13 shows a schematic of a ninth inventive embodiment of a half wave or full wave voltage multiplier VM, having N stages, provided with a smoothing capacitor $C_0$ which is connected between an output $OP_{1N}$ of the last multiplier stage $STG_N$ and the input $IP_{11}$ of the first multiplier stage $STG_1$. In some applications it is advantageous to apply this smoothing capacitor $C_0$ to further reduce the ripple in the output voltage. It may especially be advantageous in the fifth, sixth, seventh, and eight embodiments as shown in respectively FIGS. 9, 10, 11, and 12 since in these embodiments the capacitors $C_{1j}$ are left out. It is to be noted however that usually a parasitic capacitance which serves as the (or part of the) smoothing capacitor $C_0$ is present by a (partially) capacitive load which is connected to e.g. the output OP. Such a capacitive load can for instance be a high voltage connection cable between the output OP and an X-ray tube (and the X-ray tube itself).

FIG. 14 shows an example of a schematic of an X-ray apparatus XR comprising a device for generating a high voltage which comprises the inventive voltage multiplier VM for supplying a high voltage between an anode A and a cathode C of a glass vacuum X-ray tube XRT. The voltage multiplier VM supplies from the output OP, via a cable CBL, a positive high voltage to the anode A. The cathode C is grounded and is thus, in this example, connected to the midpoint of the transformer T. (It is also possible to ground the anode A and to supply a high negative voltage to the cathode C.) The cathode C is a heated filament. During operation current passes through the filament, heating it up. The heat sputters electrons off of the filament surface. The positively charged anode A, which is usually a flat disc made of tungsten, draws the electrons across the tube XRT. The voltage difference between the anode A and the cathode C is extremely high, so the electrons (electron beam EB) fly through the tube XRT with a great deal of force. When a speeding electron collides with a tungsten atom, it knocks loose an electron in one of the atom's lower orbitals. An electron in a higher orbital immediately falls to the lower energy level, releasing its extra energy in the form of a photon. Since it is a big drop the photon has a high energy level, thus it is an X-ray photon. The high-impact collisions involved in the X-ray production generate a lot of heat. For this reason a motor M rotates the anode A so that the electron beam EB is not always focused on the same area of the anode A. By this it is avoided that (part of) the anode A will melt. A cool oil bath OB surrounding the envelope also absorbs heat. The tube XRT is surrounded by a thick lead shield PB. This keeps the X-rays from escaping in all directions. A small window in the shield PB lets some of the X-ray photons escape in a narrow X-ray beam XRB. The beam XRB passes through a series of filters F on its way to e.g. a patient.

FIG. 15 shows a schematic of an apparatus comprising a cathode ray tube CRT for generating an image on a screen SCR which comprises a device for generating a high voltage which comprises the inventive voltage multiplier VM for supplying one or more high voltages between electrodes of the cathode ray tube. CRT's are for instance used in TV's, computer monitors, oscilloscopes, spectrum analyzers et cetera. In this example the CRT comprises a cathode C which can emit an electron beam EB towards the screen SCR due by high positive voltages (with respect to the cathode C) on the anodes $A_1$, $A_2$, $A_3$, $A_4$, and $A_5$. Focusing coils FCLS focus the beam EB, and deflection coils DCLS deflect the beam EB, so that a sharp and well-formed image is transmitted from the screen SCR. In this example the CRT needs several high voltages, of which some have different values, on the anodes $A_1$, $A_2$, $A_3$, $A_4$, and $A_5$. For this reason the voltage multiplier VM is provided with a multiple of outputs: output OP (with the highest high voltage) connected to the anodes $A_1$, outputs $OP_A$ and $OP_B$ (with the lowest high voltages) connected to the anodes $A_4$ and $A_5$, and outputs $OP_C$ and $OP_D$ (with intermediate high voltages) connected to the anodes $A_2$ and $A_3$.

It is possible to apply the so-called "star-triangle transformations" for groups of connected capacitors for only part of the multiplier stages $STG_j$, thus mixed configurations are possible e.g. a mix of stages from the first (FIG. 5) and third (FIG. 7) embodiments can be used to construct a voltage multiplier.

It is to be noted that in order to reduce the generation of EMI (Electro Magnetic Interference) an EMI-series arrangement of a resistor and a capacitor may be connected in series with at least one of the first, second and third inputs $IVM_1$, $IVM_2$, $IVM_3$ of the voltage multiplier VM. In case of the full wave embodiments in which the transformer T is provided with a midpoint the EMI-series arrangement is preferably connected in between the first input $IVM_1$ of the voltage multiplier VM and the midpoint of the transformer T.

It should be noted that the above-mentioned embodiments illustrate rather than limit the invention, and those skilled in the art will be capable of designing alternative embodiments without departing from the scope of the invention as defined by the appended claims. In the claims, any reference signs placed in parentheses shall not be construed as limiting the claims. The words "comprising" and "comprises", and the like, do not exclude the presence of elements other than those listed in any claim or in the application as a whole. The singular reference of an element does not exclude the plural reference of such elements. The mere fact that certain measures are recited in mutually different dependent claims does not indicate that a combination of these measures can not be used.

The invention claimed is:

1. A voltage multiplier comprising a chain of multiplier stages, each multiplier stage comprising first and second inputs and first and second outputs, which first and second outputs of a multiplier stage are coupled to respective first and second inputs of another multiplier stage except for a last multiplier stage, which first and second inputs of a first multiplier stage constitute first and second inputs of the chain, each multiplier stage comprising a series diode arrangement of two diodes coupled, in the same current conducting direction, between the first input and the first output, and an electrical-component-comprising equalizing arrangement for urging ones of distributions into mutual time-wise coincidence, said distributions representing magnitude, as a function of time, of current through respective ones of the diodes.

2. A voltage multiplier according to claim 1, wherein each multiplier stage comprises a first capacitor coupled between the first input and the first output, and a second capacitor coupled between the second input and the second output, and wherein at least one of the multiplier stages said equalizing arrangement comprises a time dependent voltage level-shifter coupled between the second output and a conjunction point of the two diodes, and in the remaining multiplier stages said equalizing arrangement comprises an electrical coupling between the second output and a conjunction point of the two diodes.

3. A voltage multiplier according to claim 2, wherein the at least one time dependent voltage level-shifter comprises a voltage level-shift capacitor.

4. A voltage multiplier according to claim 2, wherein, in each multiplier stage, said equalizing arrangement comprises a time dependent voltage level-shifter comprising a voltage level-shift capacitor.

5. A voltage multiplier according to claim 4, wherein all the capacitance values of the level-shift capacitors are dimensioned in a manner that, during operation, the currents through the diodes have equal current distributions as a function of time.

6. A voltage multiplier according to claim 1, wherein each multiplier stage comprises a first capacitor coupled between the first input and the first output, each multiplier stage except for a first multiplier stage comprises a second capacitor coupled between the second input and the second output, and wherein the first multiplier stage comprises an electrical coupling between the second input and the second output, and that, in at least one of the multiplier stages said equalizing arrangement comprises a time dependent voltage level-shifter coupled between the second output and a conjunction point of the two diodes, and in the remaining multiplier stages said equalizing arrangement comprises an electrical coupling between the second output and a conjunction point of the two diodes.

7. A voltage multiplier according to claim 6, wherein, in each multiplier stage, except for the last multiplier stage said equalizing arrangement comprises a time dependent voltage level-shifter comprising a voltage level-shift capacitor.

8. A voltage multiplier comprising a chain of multiplier stages, each multiplier stage comprising first and second inputs and first and second outputs, which first and second outputs of a multiplier stage are coupled to respective first and second inputs of another multiplier stage except for a last multiplier stage, which first and second inputs of a first multiplier stage constitute first and second inputs of the chain, each multiplier stage comprising a series diode arrangement of two diodes coupled, in the same current conducting direction, between the first input and the first output, and equalizing means for equalizing the current distributions as a function of time, of the currents through the diodes, wherein each multiplier stage comprises a first capacitor coupled between the first input and the first output, a second capacitor coupled between the second input and the second output, a series capacitor arrangement of a third and a fourth capacitor coupled between the second input and the second output, and an electrical coupling between a conjunction point of the third and fourth capacitors and a conjunction point of the two diodes.

9. A voltage multiplier according to claim 8, wherein, in each multiplier stage, the capacitance values of the second, third, and fourth capacitors are dimensioned in a manner that, during operation, the currents through the conducting diodes have equal current distributions as a function of time.

10. A voltage multiplier according to claim 1, wherein each multiplier stage comprises a first capacitor coupled between the first input and the first output; each multiplier stage except for the first multiplier stage and the last multiplier stage comprises a second capacitor coupled between the second input and the second output, a series capacitor arrangement of a third and a fourth capacitor coupled between the second input and the second output, an electrical coupling between a conjunction point of the third and fourth capacitors, and a conjunction point of the two diodes; the first multiplier stage comprises a second capacitor coupled between the second output and a conjunction point of the two diodes; and the last multiplier stage comprises an electrical coupling between the second input, the second output, and a conjunction point of the two diodes.

11. A voltage multiplier according to claim 10, wherein the capacitance value of the second capacitor in the first multiplier stage, and the capacitor values of the second, third, and fourth capacitors in each multiplier stage except in the first and the last multiplier stages are dimensioned in a manner that, during operation, the currents through the diodes have equal current distributions as a function of time.

12. A voltage multiplier according to claim 1, wherein each multiplier stage comprises a third input, a third output which is coupled to a respective third input of another multiplier stage except for the last multiplier stage, which third input of the first multiplier stage constitutes a third input of the chain, each multiplier stage comprising a further series diode arrangement of two diodes both coupled, in the same current conducting direction as in the series diode arrangement, between the first input and the first output, a first capacitor coupled between the second input and the second output, and a second capacitor coupled between the third input and the third output, and wherein, in at least one of the multiplier stages, said equalizing arrangement comprises a time dependent voltage level-shifter coupled between the second output and a conjunction point of the two diodes of the series diode arrangement, and wherein, in the remaining multiplier stages, said equalizing arrangement comprises an electrical coupling between the second output and a conjunction point of the two diodes of the series diode arrangement, and wherein, in at least one of the multiplier stages, said equalizing arrangement comprises a further time dependent voltage level-shifter coupled between the third output and a conjunction point of the two diodes of the further series diode arrangement, and wherein, in the remaining multiplier stages, said equalizing arrangement comprises an electrical coupling between the third output and a conjunction point of the two diodes of the further series diode arrangement.

13. A voltage multiplier according to claim 12, wherein the at least one time dependent voltage level-shifter comprises a voltage level-shift capacitor, and the at least one further time dependent voltage level-shifter, which corresponds to a time dependent voltage level-shifter comprising a voltage level-shift capacitor, comprises a further voltage level-shift capacitor.

14. A voltage multiplier according to claim 12, wherein, in each multiplier stage, said equalizing arrangement comprises a time dependent voltage level-shifter comprising a voltage level-shift capacitor, and a further time dependent voltage level-shifter comprising a further voltage level-shift capacitor.

15. A voltage multiplier according to claim 14, wherein all the capacitance values of the level-shift capacitors are dimensioned in a manner that, during operation, the currents through the diodes of the series diode arrangements have equal current distributions as a function of time, and all the capacitance values of the further level-shift capacitors are dimensioned in a manner that, during operation, the currents through the diodes of the further series diode arrangements have equal current distributions as a function of time.

16. A voltage multiplier according to claim 1, wherein each multiplier stage comprises a third input, a third output which is coupled to a respective third input of another multiplier stage except for the last multiplier stage, which third input of the first multiplier stage of the chain constitutes a third input of the chain, each multiplier stage comprising a further series diode arrangement of two diodes both coupled, in the same current conducting direction as in the series diode arrangement, between the first input and the first output, each multiplier stage except for the first multiplier stage comprises a first capacitor coupled between the second input and the second output, and a second capacitor coupled between the third input and the third output, and wherein the first multiplier stage comprises a first electrical coupling between the second input and the second output, and a second electrical coupling between the third input and the third output, and wherein, in at least one of the multiplier stages, said equalizing arrangement comprises a time dependent voltage level-shifter coupled between the second output and a conjunction point of the two diodes of the series diode arrangement, and in the remaining multiplier stages said equalizing arrangement comprises an electrical coupling between the second output and a conjunction point of the two diodes of the series diode arrangement, and in at least one of the multiplier stages said equalizing arrangement comprises a further time dependent voltage level-shifter coupled between the third output and a conjunction point of the two diodes of the further series diode arrangement, and in the remaining multiplier stages said equalizing arrangement comprises an electrical coupling between the third output and a conjunction point of the two diodes of the further series diode arrangement.

17. A voltage multiplier according to claim 16, wherein, in each multiplier stage, except for the last multiplier stage said equalizing arrangement comprises a time dependent voltage level-shifter comprising a voltage level-shift capacitor, and a further time dependent voltage level-shifter comprising a further voltage level-shift capacitor.

18. A voltage multiplier according to claim 1, wherein each multiplier stage comprises a third input, a third output which is coupled to a respective third input of another multiplier stage except for the last multiplier stage, which third input of the first multiplier stage constitutes a third input of the chain, each multiplier stage comprises a further series diode arrangement of two diodes both coupled, in the same current conducting direction as in the series diode arrangement, between the first input and the first output, a first capacitor coupled between the second input and the second output, a second capacitor coupled between the third input and the third output, a series capacitor arrangement of a third and a fourth capacitor coupled between the second input and the second output; a further series capacitor arrangement of a fifth and a sixth capacitor coupled between the third input and the third output, an electrical coupling between a conjunction point of the third and fourth capacitors and a conjunction point of the two diodes of the diode arrangement, and a further electrical coupling between a conjunction point of the fifth and sixth capacitors and a conjunction point of the two diodes of the further diode arrangement.

19. A voltage multiplier according to claim 18, wherein, in each multiplier stage, the capacitance values of the first, second, and third capacitors are dimensioned in a manner that, during operation, the currents through the diodes of the series diode arrangements have equal current distributions as a function of time.

20. A voltage multiplier according to claim 1, wherein each multiplier stage comprises a third input, a third output which is coupled to a respective third input of another multiplier stage except for the last multiplier stage, which third input of the first multiplier stage constitutes a third input of the chain, each multiplier stage comprises a further series diode arrangement of two diodes both coupled, in the same current conducting direction as in the series diode arrangement, between the first input and the first output, each multiplier stage except for the first multiplier stage and the last multiplier stage comprises a first capacitor coupled between the second input and the second output, a second capacitor coupled between the third input and the third output, a series capacitor arrangement of a third and a fourth capacitor coupled between the second input and the second output, a further series capacitor arrangement of a fifth and a sixth capacitor coupled between the third input and the third output, an electrical coupling between a conjunction point of the third and fourth capacitors and a conjunction point of the two diodes of the series diode arrangement, a further electrical coupling between a conjunction point of the fifth and sixth capacitors and a conjunction point of the two diodes of the further series diode arrangement, the first multiplier stage comprises a first capacitor coupled between the second output and a conjunction point of the two diodes of the series diode arrangement, and a second capacitor coupled between the third output and a conjunction point of the two diodes of the further series diode arrangement, and the last multiplier stage comprises an electrical coupling between the second input, the second output, and the conjunction point of the two diodes of the series diode arrangement, a further electrical coupling between the third input, the third output and a conjunction point of the two diodes of the further series diode arrangement.

21. A voltage multiplier according to claim 20, wherein the capacitance value of the first capacitor in the first multiplier stage, and the capacitor values of the first, second, and third capacitors in each multiplier stage except in the first and the last multiplier stages are dimensioned in a manner that, during operation, the currents through the diodes of the series diode arrangements have equal current distributions as a function of time.

22. A voltage multiplier according to claim 1, wherein the voltage multiplier further comprises a smoothing capacitor coupled between the first output of the last multiplier stage and the first input of the first multiplier stage.

23. Apparatus comprising a device for generating a high voltage, the device for generating the high voltage comprising a voltage multiplier as defined in claim 1.

24. Apparatus comprising an X-ray tube for generating X-rays comprising a device for generating a high voltage for the X-ray tube, the device for generating the high voltage comprising a voltage multiplier as defined in claim 1.

25. Apparatus comprising a cathode ray tube for generating an image on a screen comprising a device for generating a high voltage for the cathode ray tube, the device for generating the high voltage comprising a voltage multiplier as defined in claim 1.

26. The voltage multiplier of claim 1, said distributions representing said magnitude, as said function of time, with said voltage multiplier having reached its steady state.

27. The voltage multiplier of claim 26, said equalizing arrangement being configured such that said ones of distributions, as a result of inclusion in said multiplier of said equalizing arrangement, no longer temporally follow each other successively.

28. The voltage multiplier of claim 1, all of the distributions for diodes presently conducting current being among said ones of distributions.

29. The voltage multiplier of claim 1, said equalizing arrangement being configured for equalizing over time a distribution from among said ones of distributions.

30. The voltage multiplier of claim 1, said diodes being comprised of two groups, the diodes for at least one of which having said ones of distributions, each group having its respective current conducting direction.

31. The voltage multiplier of claim 1, said equalizing arrangement comprising, as said electrical-component, a capacitor.

32. A method for making a voltage multiplier comprising:
providing a chain of multiplier stages, each multiplier stage comprising first and second inputs and first and second outputs, which first and second outputs of a multiplier stage are coupled to respective first and second inputs of another multiplier stage except for a last multiplier stage, which first and second inputs of a first multiplier stage constitute first and second inputs of the chain, each multiplier stage comprising a series diode arrangement of two diodes coupled, in the same current conducting direction, between the first input and the first output, and an electrical-component-comprising equalizing arrangement for urging ones of distributions into mutual time-wise coincidence, said distributions representing magnitude, as a function of time, of current through respective ones of the diodes.

* * * * *